United States Patent [19]
Palm et al.

[11] 3,849,141
[45] Nov. 19, 1974

[54] PULVERULENT METAL COATING COMPOSITIONS

[75] Inventors: Bert E. Palm, Mentor; Alexander W. Kennedy, Chardon, both of Ohio

[73] Assignee: Diamond Shamrock Corporation, Cleveland, Ohio

[22] Filed: Oct. 18, 1972

[21] Appl. No.: 298,647

[52] U.S. Cl................ 106/1, 106/14, 117/71 M, 117/131, 148/6.2
[51] Int. Cl............................................. C09d 5/10
[58] Field of Search........ 106/1, 14; 117/131, 71 M; 148/6.2

[56] References Cited
UNITED STATES PATENTS

| | | | |
|---|---|---|---|
| 3,130,061 | 4/1964 | McMahon et al. | 106/84 |
| 3,578,509 | 5/1971 | Palm | 148/6.2 |
| 3,671,331 | 6/1972 | Malkin et al. | 148/6.2 |
| 3,687,739 | 8/1972 | Kennedy et al. | 148/6.2 |
| 3,708,350 | 1/1973 | Kennedy et al. | 148/6.2 |

*Primary Examiner*—Lorenzo B. Hayes
*Attorney, Agent, or Firm*—John J. Freer; Roy Davis

[57] ABSTRACT

Coating compositions, for application to metal substrates prior to painting of the substrate, are formulated with special particulate zinc which is very finely divided, e.g., containing virtually no particles having size greater than microns. Such pre-paint compositions on metal substrates offer excellent coating adhesion to subsequently applied paint.

21 Claims, No Drawings

PULVERULENT METAL COATING COMPOSITIONS

BACKGROUND OF THE INVENTION

Coating compositions for metal substrates that are applied prior to painting are typically used to impart corrosion resistance to metal surfaces as well as enhance adhesion of subsequently applied paints. One or both of these characterisitcs can be augmented by including in the pre-paint coated composition a particulate metal such as finely divided zinc. For example, in U.S. Pat. No. 3,671,331 there are disclosed pulverulent zinc containing chromium bonding compositions that contain, in addition to the zinc, a hexavalent-chromium-providing compound and reducing agent therefore in liquid medium.

Such compositions exhibit excellent adherence to metal substrates and offer many desirable characteristics, including the formation of a firm bond between subsequently applied paints and the underlying metal substrate. In U.S. Pat. No. 3,067,045 there is disclosed a coating composition providing a phosphate film. More particularly, the composition contains finely divided zinc metal in an alkaline aqueous solution of an alkali metal phosphate. These compositions produce continuous, firmly adherent films on substrate metals. In U.S. Pat. No. 3,462,319, although the teaching goes on to discuss application of an organic film-forming resin, there is first suggested the eariler application of a chromic acid/phosphoric acid coating to a metal surface, such coating also containing up to 40 percent of an inorganic filler material.

Suitable filler materials for this last mentioned coating composition include zinc metal powder. The physical description of suitable powders has been touched upon the some extent in these patents, but a more particular description of representative commercially available zinc dusts useful in coating compositions for metal substrates has been presented in U.S. Pat. No. 3,372,038. In this patent there are listed four commercially available zinc dusts and a more complete detailing of their characteristics is presented. Exemplary of the dusts listed therein are Asarco No. 1 as well as Asarco LD 111, both made commercially available by American Smelting and Refining Co.

This same company has more recently brought out their L 15 grade of zinc dust. Ostensibly all of these dusts find utility in coating compositions for application to metal substrates. Since they may be included in compositions which are applied to a metal substrate prior to application of a paint topcoating, considerations go beyond the characteristcs the zinc dust imparts to the pre-paint coating. Such other considerations include the characteristics afforded by the dust when the total coated article, including the pre-paint coating and subsequent topcoatings, is obtained.

For example, after pre-paint coating, a primer is often applied and the resulting coated article most usually proceeds through further working. In addition to such further operation as subsequent topcoating, the coated metal can typically be subjected to a metal forming operation. For example, in the automotive industry, a coated metal workpiece may proceed through as many as five or more operations initiated by drawing, or pressing, and continuing on through a series of trimming, punching and bending steps. This working, and especially the stamping, pressing or drawing, places the previously applied coating system under severe conditions for maintaining coating adhesion to the substrate.

In such operations the coating is subjected to a slip, or shear, adhesion condition. As the metal is pressed, as into a die, it flows, sometimes sliding and stretching, thereby subjecting the coating to shear. It would be highly desirable to enhance coating adhesion under such conditions while maintaining other desirable coating characteristics, e.g., impact adhesion and corrosion protection.

SUMMARY OF THE INVENTION

It has now been found that shear adhesion of paint top-coatings to pre-paint treated metal surfaces can be desirably enhanced when such pre-paint compositions formulated with zinc dust contain a special, finely divided dust. Additionally, suspension of the dust in the coating composition prior to coating application may be improved. Moreover, other coating characteristics such as corrosion resistance and impact adhesion cab be desirably maintained.

In one aspect, the present invention is directed to a coating composition comprising liquid medium containing pulverulent zinc having particle size such that virtually all of the particles have size finer than 16 microns, with less than about 10 weight percent of the particles having size greater than 10 microns and with from about 5 to about 25 weight percent having size finer than 2 microns, and having an average size of from about 3.2 to about 6 microns.

The present invention is also directed to the method of preparing metal substrates for painting, as well as to pre-painted and painted articles that can be obtained. Another aspect of the present invention is to a composition containing a special, finely divided zinc dust in liquid medium, such composition finding use for addition to pre-paint coating compositions.

DESCRIPTION OF THE PREFERRED EMBODIMENTS

The known pre-paint metal treating compositions need not be complex. They may be simply solutions of $CrO_3$ in water, advantageously with a wetting agent, as discussed in U.S. Pat. No. 3,351,502. Such a solution, as prepared by chromic acid and water, can be entirely supplied by chromic acid or can also contain a salt of chromium, as has been discussed in U.S. Pat. application, Ser. No. 96,967 now U.S. Pat. No. 3,687,738. Such uncomplex metal treating compositions need not be simply aqueous based. For example, U.S. Pat. No. 2,927,046 teaches a pre-paint bonding composition of chromic acid dissolved in tertiary butyl alcohol.

The treating compositions may incorporate chromic acid and phosphoric acid together in the same aqueous mixture, as has been taught in U.S. Pat. No. 3,462,319. Also, as shown in U.S. Pat. No. 3,067,045, useful aqueous treating solutions can contain an alkali metal phosphate plus a metal oxide, for regulating and extending the useful life of the coating composition. Although it is well known that finely divided zinc is reactive with strong acids such as phosphoric acid, it is also well recognized that very useful coating compositions can be obtained when the zinc is present along with chromic acid. Or, as in the case of compositions containing alkali metal phosphate, the metallic zinc finds use when such compositions have an alkaline pH.

Although many of the treating solutions are formulated so as to be resin free, particularly useful compositions may also be prepared that contain resin. For example, in U.S. Pat. No. 3,630,751 a chromic acid or chromate treating solution is disclosed and such further contain a water-soluble copolymer consisting of itaconic acid and acrylonitrile. The incorporation of such resins typically improves corrosion resistance of the resulting coating composition. It has also been taught to use, in very minor amounts, such substances as dispersible emulsions of polyacrylic acids or an acrylic ester copolymer latex in conjunction with chromic acid or the like. Such substances in the minor amounts as taught in U.S. Pat. No. 3,185,596 serve as reducing agents, during the subsequent coating formation, acting on the hexavalent-chromium-providing substance, e.g., the chromic acid.

In addition to referencing these pre-paint compositions containing hexavalent-chromium and the reducing agent therefor as treating solutions, such compositions have also been referred to as bonding coats or bonding compositions. A typical coating of this nature has been discussed in U.S. Pat. No. 2,846,342 wherein the hexavalent-chromium-providing substance is a chromate, more specifically ammonium dichromate. In the bonding coating, reducing agents need not be added to the coating compositions directly, but rather supplied to a metal surface already containing an applied chromic acid solution such as taught in U.S. Pat. No. 2,768,103. Combinations of reducing agents are disclosed for these bonding coat compositions. An example of this is succinic acid, or other dicarboxylic acids of up to 14 carbon atoms, in mixture with one another or with one or more organic substances exemplified by aspartic acid, acrylamide, or succinimide, as has been disclosed in U.S. Pat. No. 3,382,081. These bonding coatings can be prepared to exhibit particular properties, e.g., electrically resistant coatings through the incorporation in the coating composition of a source of silicon such as discussed in U.S. Pat. No. 3,421,949.

One of the general avenues of development in regard to these pre-paint metal treating compositions concerns the addition of pulverulent metal to the compositions, particularly pulverulent zinc. Thus, U.S. Pat. No. 3,687,738 discloses the development of a coating composition that may contain, as principle ingredients, pulverulent zinc plus chromic acid. Also, in U.S. Pat. Nos. 3,067,045 and 3,462,319, both mentioned hereinbefore, zinc metal powder has been taught as being useful. More recently the U.S. Pat. No. 3,671,331 discloses employing finely divided zinc most especially in bonding coatings, i.e., compositions containing hexavalent-chromium-providing substance and a reducing agent therefor.

In accordance with the present invention wherein the presence of pulverulent zinc is to be included in the pre-paint coating composition, the zinc must have a particle size such that virtually all particles have size finer than 16 microns, i.e., at most 0.5–1 weight percent are more coarse. Advantageously, for enhancing paint topcoat adhesion under severe conditions typically encountered commerically where such adhesion is most severely tested, e.g., commercial stamping and drawing operations, such particulate zinc has not more than 2 weight percent of particles having size greater than 15 microns. Further, such finely divided zinc should have particle size such that less than about 10 weight percent of the particles have size greater than 10 microns. Preferably, again for augmented topcoat adhesion, less than about 6 weight percent have size greater than about 10 microns.

Additionally, it is most advantageous if the pulverulent zinc having an average particle size from about 3.2 to about 6 microns, although it can be appreciated that such average may be sligtly less or greater, e.g., from below 3.2 to about 6.2 microns. As used herein, the average particle size is one wherein the weight percent of the particles having larger size is equal to the weight percent having size finer than the average. However, as can be appreciated from the foregoing discussion, the average particle size of the finely divided zinc must be viewed for purposes of the present invention along with the overall particle size distribution of the zinc. Finely divided zinc has been previously available having average particle size varying from 3–4 up to 6 mircons. But, owing to a broad particle size distribution, such materials are not suitable.

For this invention, in addition to careful control of the larger particles, and for enhanced topcoat adhesion such as in the above mentioned stamping and drawing operations, the pulverulent zinc should have a particle size such that from about 5 to about 25 percent have size finer than 2 microns. Advantageously, again for topcoat adhesion, the finley divided zinc has between about 10–20 weight percent of particles finer than 2 microns. Further, it is typical for the pulverulent zinc to have less than 5 weight percent with size finer than 1 micron. Although it is contemplated to use the pulverulent zinc to furnish all of the finely divided zinc in a pre-paint coating composition, it may be advantageious, e.g., for economy, that it furnish a portion only of such zinc. Regardless, for enhancing characteristics such as corrosion resistance, sufficient of the particulate zinc should be supplied to provide a pre-paint coating having preferably from about 300 to about 600 milligrams per square foot of coated substrate of the zinc, although from about 200 to about 2,000 milligrams per square foot is broadly contemplated.

It is neither commerically feasible, nor desirable, to obtain finely divided zinc having virtually no oxide content. Hence, the pulverulent zinc will contain oxide, and may have as much as 12–15 weight percent oxide or more, basis total weight of the zinc. It is, however, more typical that the zinc have an oxide content of less than 10 percent, for example 3–5 weight percent. As will be recoginzed by those skilled in the art, the particulate zinc will generally contain very minor amounts of other ingredients. Exemplary of such other materials are about 0.2 weight percent or less or lead and iron and about 0.1 weight percent or less of cadmium. In metal coating compositions there have been employed blends of pulverulent metals, as disclosed for example, in U.S. Pat. No. 3,687,738. Thus it is contemplated in the present invention to use metallic blends, e.g., containing up to 20 weight percent or more of pulverulent aluminum or other metals where such exist in appropriate particle size, with a balance of particulate zinc.

The finely divided zinc can be pre-blended with addtional substances prior to admixing of the zinc with other material to form the pre-paint coating composition. For example, it has already been shown in U.S. Pat. No. 3,318,716 to form an admix of aluminum flake, a polymeric glycol plus wetting agent. This admix can be blended with other coating composition ingredients, which other ingredients for convenience can be referred to as a coating composition precursor. The admix in minor amount finds utility as an anti-foaming agent when mixed into the precursor composition. In greater amounts the admix will provide pigmentation to the precursor composition.

In the present invention the admix may be formed by blending the particulate zinc with, for example, a water-dispersible organic liquid and thickening agent. Such an admix may be prepared with an organic liquid such as diethylene glycol and a thickening agent such as hydroxyethyl cellulose with serviceable additional thickeners including heteropolysaccharides. Such admixes can also be water based and these may also contain a water-dispersible organic liquid in the admix composition. Typically, such admixes have between about 0.1–3 weight percent of thickener, basis weight of tha admix exclusive of liquid medium. Where a water dispersible organic liquid is employed in the admix it is typical to have a weight ratio of the particulate zinc to organic liquid from about 1:4 to about 4:1. These admixes may be readily blended into a pre-paint coating composition precursor; such precursor may be quite simple, e.g., merely chromic acid solution in water. The nature of the precursor will depend upon the nature of the pre-paint coating composition. For example, for a bonding composition the precursor will contain a hexavalent-chromium-providing substance and reducing agent.

As has already been touched upon hereinbefore, the liquid medium for the pre-paint coating compositions may include water and tertiary butyl alcohol. Thus, substantially all of the pre-paint coating compositions, ostensibly for economy, are water based. But for additional, or alternative substances to supply the liquid medium, there have been taught, as in U.S. Pat. No. 3,437,531, blends of chlorinated hydrocarbons and a tertiary alcohol including alcohols other than tertiary butyl alcohol. It would appear then in the selection of the liquid medium, economy is of major importance and thus such medium would most always contain readily commercially available liquids.

The prepared, treated metal surfaces are particularly serviceable as undercoatings for topcoats. Although the nature of the topcoat is very broad in contemplation, topcoatings of especial interest are those that contain finely divided pulverulent material. Of these topcoatings, although finely divided pigments and fillers are important, topcoatings of special importance contain pulverulent metal that is more coarse than the pulverulent zinc of the pre-paint coating. For example, it has already been shown in U.S. Pat. No. 3,671,331 that a primer containing a particulate, electrically conductive pigment provides a highly serviceable topcoating for a metal substrate that is first treated with a bonding coating composition containing a pulverulent metal such as finely divided zinc.

Additionally, U.S. Pat. No. 3,687,739 shows the special advantages obtained by applying a topcoating, also containing a particulate electrically conductive pigment, over an undercoating wherein key ingredients are chromic acid and a pulverulent metal such as finely divided zinc. Such topcoatings, which are representative of those that contain pulverulent metal, are often for convenience referred to as "weldable primers."

These primers contain an electrically conductive pigment plus a binder in a vehicle. Thus, it has been discolsed in U.S. Pat. No. 3,110,691 that a suitable zinc base paint composition for application to a metallic surface prior to welding can be prepared where key ingredients include not only the particulate zinc but also a liquid vehicle including a resinous film forming binder such as epoxy resin. Likewise, U.S. Pat. No. 3,118,048 shows a coating composition, that may be applied prior to welding, and has as chief ingredients a solvent forming at least a portion of the liquid vehicle and further containing a synthetic resin film-forming, or binder, component, of which modified alkyd resins are exemplary. In general, the particulate electrically conductive pigments in the weldable primers are aluminum, copper, cadmium, steel, carbon, zinc or magnetite, i.e., the magnetic oxide of iron, and these primers of particular interest include such pigments as particles that include particles of larger size than the particulate zinc in the pre-paint coating. Also, the binder components may include polystyrene, chlorinated or isomerized rubber, polyvinyl acetate and polyvinyl chloride-polyvinyl acetate copolymers, alkyd/melamine, and epoxy resin.

A topcoating formulation applicable to metal substrates, without weldability in mind, contains particulate zinc along with zinc oxide. Such paints are often formulated with a zinc dust to zinc oxide ratio of about 4:1, although such ratio may be as high as 9:1. Total pigment concentrations will vary considerably and are typically dependent upon the ratio of the zinc to the zinc oxide. Also, the ingredients in the topcoating formulation will typically be dependent upon the zinc to zinc oxide ratio. For example, where such ratio is 4:1 the vehicle usually employed is linseed oil or other oleoresinous medium. At ratios greater than 4 to 1, and with pigment concentrations ranging up to 90 to 95 percent, such compositions typically include polystyrene plasticized with chlorinated diphenyls.

Another topcoating system of special consideration has been referred to in the prior art, most ostensibly for convenience, as "silicate coatings." These appear to be aqueous systems that contain a finely divided metal such as powdered zinc or aluminum, lead, titanium or iron plus a water soluble or water dispersible binder. Representative of the binders are alkali metal silicates, an organic silicate ester, or a colloidal silica sol. Thus, U.S. Pat. No. 3,372,038 shows an aqueous coating system for providing corrosion resistance to metal substrates with a formulation containing a finely divided zinc powder plus an organic ammonium silicate. Although such silicate coatings are not typically employed before welding, U.S. Pat. No. 3,469,071 discloses arc-welding of a steel having a protective coating that may be derived from a coating composition containing inert silicate fillers, zinc powder and partially hydrolized esters of amphoteric metal binders, for example ethyl silicate. In U.S. Pat. No. 2,944,919 an aqueous based coating composition that contains a sodium silicate may further contain a finely divided metal in addition to zinc, such as magnesium, aluminum, manganese and titanium.

Although in the considerations for a topcoating over the treated metal surface, such above discussed topcoatings are of special interest, the treated metal substrate can be further topcoated typically with any suitable paint, i.e., paint, primer, enamel, varnish or lacquer. Such paints may contain pigment in a binder or can be unpigmented as exemplified by cellulose lacquers, rosin varnishes, an oleoresinous varnishes. The paints can be solvent reduced or may be water reduced, e.g., latex or water soluble resins, including modified or soluble alkyds, or the paints can have reactive solvents such as in the polyesters or polyurethanes.

Particularly when the metal substrate to be coated is a weldable metal substrate, additional composite coating systems may be contemplated. For example, after the pre-paint coating composition of the present invention is applied to a weldable metal substrate, such substrate may be topcoated with a weldable primer and then, following welding, the resulting metal assembly is further topcoated. The weldable primers, and often the silicate primers, are formulated with subsequent topcoating of such primers being taken into consideration during formulation. Since at least the weldable primers typically contain an electrically conductive pigment, the topcoating may be an electrocoated primer.

The electrodeposition of film-forming materials is well known and can include electrocoating of simply a film-forming material in a bath where such a bath may contain one or more pigments, metallic particles, drying oils, dyes, extenders and the like. Representative film-forming systems of this nature are set forth, for example, in U.S. Pat. Nos. 3,304,250 and 3,455,805. Also, substances of particular interest, for example in the automotive industry, are the anodically deposited film-forming materials as exemplified by U.S. Pat. No. 3,230,162. Included in these composite coating systems there can be an electrophoretically deposited zinc paint. Such may be deposited, for example, on the pre-paint treated metal surface of the present invention and the deposited zinc paint provides intermediate coating for subsequent topcoating. In U.S. Pat. No. 3,464,906 a zinc paint that can be electro-deposited and contains water-soluble or dispersible resins as a binder in aqueous medium, is taught.

Reference has been made hereinbefore to welding and specifically to arc-welding. So long as the metal substrate is weldable, the pre-paint coating composition can be adapted to provide continued weldability in addition to corrosion resistance for the metal substrate. Thus a pre-paint coating composition of the present invention but formulated under considerations presented in U.S. Pat. No. 4,687,738 will provide for retention of weldability of the substrate. Furthermore, when reference is made herein to welding, the subsequent welding under consideration may be electrical resistance welding and such may be spot welding, i.e., localized electrical resistance welding, or seam welding such as with roller electrodes.

Before application of the pre-paint coating composition to a metal substrate it is generally advisable to remove foreign matter from the metal surface by thoroughly cleaning and degreasing. Degreasing can be accomplished with known agents such as sodium, metasilicate, caustic soda, carbon tetrachloride, trichlorethylene and the like. The use of commercial alkaline cleaning compositions may be employed which combine washing and mild abrasive treatment, e.g., an aqueous trisodium phosphate-sodium hydroxide cleaning solution. In addition to cleaning, the substrate can undergo cleaning plus etching, for example, with a strong inorganic acid etching agent.

The following examples show ways in which the invention has been practiced but should not be construed as limiting the invention. In the examples, the following procedures have been employed.

PREPARATION OF TEST PANELS

Steel test panels, 4 × 8 inches, and all being cold rolled, low carbon steel panels are prepared for coating by first scrubbing with a cleaning pad which is a porous, fibrous pad of synthetic fiber impregnated with an abrasive. Thereafter, the scrubbed panels are immersed in a cleaning solution typically containing chlorinated hydrocarbon and maintained at about 180°F., or containing 5 ounces, per gallon of water, of a mixture of 25 weight percent tripotassium phosphate and 75 weight percent ppotassium hydroxide. This alkaline bath is maintained at a temperature of about 150°–180°F. Following the cleaning, the panels are rinsed with warm water and preferably dried.

EXAMPLE 1

A pre-paint coating composition for application to cleaned test panels, is prepared by mixing with 962 milliliters (mls.) of water, 2 grams of heteropolysaccharide dispersing agent, 2 mls. of formalin, 32 grams of chromic acid, 5.33 grams of succinic acid, 2.67 grams of succinimide, 14 grams of zinc oxide, and one drop of a wetter which is a nonionic, modified polyethoxide adduct having a viscosity in centipoises at 25°C. of 180 and a density at 25°C. of 8.7 lbs. per gallon. For comparative purposes, this formulation further contains 150 grams per liter of a commercially available L–15 zinc dust manufactured by American Smelting and Refining Co. The zinc dust has an average particle size of 5.1 microns, with about 11 percent of the particles having size greater than 10 microns and a maximum particle size of about 26 microns; further, this zinc dust has about 5 weight percent of the particles finer than 2 microns. Panels are dip coated into this comparative pre-paint composition, removed and excess composition is drained from the panels, followed by air drying at room temperature and then baking for 4.5 minutes in an oven at a temperature of 550°F. The panels have a coating weight of particulate zinc of 520 milligrams per square foot.

Next, a particulate zinc is obtained preparatory to formulating a pre-paint composition representative of the present invention. The zinc has an average particle size of 3.2, with one weight percent having size greater than 10 microns and all particles finer than 13 microns; this particulate zinc further has 17 weight percent of the particles finer than 2 microns, all as determined by Coulter Counter measurement. This zinc is obtained as the fine fraction from classification of the above described commercial L-15 zinc powder. This fine fraction is obtained by classification in a Donaldson particle classifier manufactured by the Donaldson Company, Inc., Corad Division.

In essence, the commercially available L–15 zinc dust is automatically fed into a rotating chamber while three variables, i.e., airflow, rotor speed and vortex freedom, are adjusted. In this way, the classifier, which is more specifically described in U.S. Pat. No. 3,491,879, controls the drag and centrifugal force on the inflow of particles. By this operation, the fine fraction used in the pre-paint composition of the present invention, and identified herein below as the "classified" zinc, is obtained from the vortex of the rotor apparatus while the separated, coarse zinc particle fraction is removed at the periphery of such apparatus. For demonstrating utilization of this zinc dust representative of the present invention, this classified zinc is used to prepare a pre-paint composition as described above, which resulting composition is the same except for containing 150 grams per liter of the classified zinc dust. From this composition, pre-painted panels are then prepared also as above described.

Before testing, all panels are primer topcoated. The primer, initially, is a commercially available primer which is a zinc-rich weldable primer having at first a weight per gallon of 15.4 lbs., an initial solids volume of 30 percent, and containing initially 64 weight percent of nonvolatiles. The binder component is prepared from a high molecular weight epoxy resin. Prior to use, this primer is reduced to a viscosity of 45 seconds as measured on a No. 4 Ford cup with an aromatic solvent prepared synthetically from petroleum and having a flash point of 145°–150°F. It is lastly blended with 10 weight percent, basis total weight of the primer, of the above described commercial L–15 pulverulent zinc for supplementing the zinc already present in the primer. This primer is applied to all of the pre-painted panels by drawing the primer down over the panel with a No. 20 draw bar to provide a smooth, uniform primer coat on each of the pre-painted panels. Resulting coated panels are cured for 4 minutes in an oven at 550°F.

The adhesion of the coating system on the panel under shearing force is then measured in the draw test. In this test the panel is first oiled on both sides of the panel with a light flex oil. The panel is then drawn through the draw test; next it is pressed to return the panel to its original shape, and finally the panel, without further oiling, is subjected again to the draw test. After removal from the second draw, the panel is wiped clean and is then visually inspected to determine the percentage of the exposed bare metal, or alternatively of the coating system retained on the panel.

In this inspection, panels are compared one with the other, and the percent retention is generally estimated simply after visual inspection, although, the panels may be subsequently soaked for 10 seconds in copper sulphate solution, containing 160 grams of copper sulphate per liter of water. This facilitates the visual determination of what percentage of the panel is left uncovered owing to the copper sulphate plating on the base steel, but not on burnished zinc. That is, the copper sulphate will not plate on the coating where the zinc has been polished by scraping but not removed to bare steel. The passage of the panel twice through the draw test is found from experience to better correlate results for coating adhesion under shear force with such results as would be observed in industry. For example, in the automotive industry as has been mentioned hereinbefore, primer coated panels often proceed through as many as five or more operations, including drawing, pressing, trimming, punching and bending.

In the draw test, more specifically, there is used a Tinius Olsen Ductomatic Sheet Metal Tester, Model BP–612–N. This machine is commonly used in the steel industry for determining the ductility of steel panels. In general, and about 1.75 × 12 inches steel panel is held firmly between male and female dies, each having a central aperture, to permit a metal ram to move upwardly through the dies for a pre-selected distance. The ram forces the panel upwardly in the aperture of the male die, resulting in the pulling and stretching of part of the panel through a portion of the mating surface of the dies. More particularly, the female die, measuring approximately 3.5 × 6 × 0.75 inches is placed so that its central aperture of about 2 × 1, inches is located directly over the ram.

The panel for testing is then placed flat across the female die so that a portion of the panel projects out from one die edge. The male die, of essentially similar dimensions to the female die, is then placed on top of the test panel; its central aperture is positioned over the metal ram. The female die on its upper surface contains two projecting ridges across the width of the die, one on each side of the aperture and having an inverse U-shape. The lower face of the male die is machined to have two U-shaped grooves, each about 0.25 inch deep, one on each side of the aperture, and across the width of the undersurface. The ridges provide a snug fit into the corresponding grooves, thereby enhancing the firm grip for the dies on the test panel. Also, one groove/ridge configuration provides two bearing, i.e., scraping, surfaces during the test, as discussed further hereinbelow.

At each corner, the female die has a pin extending upwardly for mating with a corresponding aperture in the male die. These pins are for maintaining stability of the dies during the test and are not in contact with the test panel. After the male die is in place, a hinged breach is pulled down on top of the male die and locked. The portion of the panel projecting out from the dies is clamped. By such action, the clamping of approximately one-half of the panel is more firmly established; thus, during testing only about the other half of the panel will be free to move and be drawn during the test. After clamping, the instrument clamp load is set at 3,000 lbs., the rate of draw dial provided on the instrument is set at 10, and the ram is permitted to move upwardly for a distance of about 2.5 inches. During this movement, about the first half-inch of ram movement is necessitated to move the rounded-dome ram into contact with the panel and the remaining about 2 inches of movement actually draws half of the panel through the mated die surfaces.

In typical operation for an 0.036-gauge steel, the ram is moved upwardly at a force of about 2,500–4,000 lbs. The half-portion of the panel tested is drawn across three bearing surfaces. Two of these are provided by the edges of the groove in the groove/ridge configurations. The third bearing surface is the edge of the male aperture parallel and closest to the groove providing the other two bearing surfaces. The panel portion thus actually subjected to the test typically measures about 1¾ × 2.5 inches. With the above mentioned 0.036-gauge steel, this section will often exhibit an about 20–25 percent total metal extension, beyond its original test length, after the second draw. After such draw, the general configuration of the panel shows a U-shaped central portion that has been pushed upwardly about 2 inches from the original flat surface.

The panels prepared as described hereinabove and after being drawn twice in the draw test, but without pressing the panels after the second draw to return them to their original shape, are subjected to the corrosion resistance test by means of the standard salt spray (fog) test for paint and varnishes as described in ASTM B–117–64. In this test, the primer coated and drawn panels are placed in a chamber held at constant temperature where they are exposed to a fine spray (fog) of a 5 percent salt solution for a period of time as noted in the table below. Upon removal from the chamber the panels are rinsed in water and then dried. The extent of corrosion, i.e., red rust, on the test panels is determined by visual inspection through comparision of panels one with the other.

In Table 1 below the results of this corrosion resistance test are noted as results from salt spray testing and is a percentage of the panel face showing red rust after testing for 88 hours. The results of the double draw test are also listed in the table below and are an average of two panels subjected to the test.

TABLE 1

| Pre-paint Coating | Salt Spray % Corrosion After Draw 88 hours | Double Draw % Coating Retained |
| --- | --- | --- |
| Commercial* | 36 | 93** |
| Classified | 12 | 100** |

* Comparative panels.
** Average of two panels.

It will be noted that the panel initially reported in the table contains the commercial zinc in the pre-paint coating and that the subsequent panel, has the pre-paint coating representative of the present invention. The difference in the percent corrosion in salt spray testing is significant between the coating systems. The difference between the panels on the drawn adhesion test may not be as readily understood. To be fully appreciated, is must be kept in mind that the increase in coating retention is achieved at a level of coating retention that is above the 90 percent retention level, where even a lesser increase can be extremely difficult to achieve, and where an increase to 100 percent retention might be regarded as not possible. Now, however, with the pre-paint coating composition of the present invention, such increase is readily and consistently obtained.

EXAMPLE 2

A pre-paint coating composition of Example 1, representative of the present invention, is applied to clean test panels and subsequently cured all in the manner above described. A comparative pre-paint coating composition is also prepared in accordance with hereinabove described teachings, excepting that the commercially available zinc dust is the No. 280 zinc dust manufactured by American Smelting and Refining Company. This comparative zinc dust has an average particle size of 3.65 microns with about 15 percent of the particles having size greater than 10 microns and 5 weight percent being more coarse than 16 microns. Further, this commercial zinc dust has about 17.5 weight percent of the particles finer than 2 microns. This pre-paint coating composition prepared for comparative purposes is applied and cured onto clean test panels all in the manner described above.

All panels, i.e., those pre-painted with a coating composition of the present invention as well as with the comparative pre-paint composition, are all primer coated. This primer is the weldable primer of Example 1 excepting there is no addition to the primer of supplemental commercial L-15 zinc dust. Such primer coating is done in the manner of Example 1 and the primer is subsequently cured as taught in Example 1, to provide on all of the panels a primer having a dried film thickness of about 0.5 mil. The primer adhesion for the subsequently prepared panels is tested under shear force in the draw test in the manner of Example 1. Panels are also subjected to salt spray testing as detailed hereinabove, but for this test, such panels have not been previously subjected to the draw test.

The results with the panels in both the salt spray test and draw coating adhesion test are reported in Table 2 below. It will be noted in the table below the corrosion resistance testing for panels that have not been drawn is not only determined on the face of the tested panels but also at a bend. The bend for the coated panel is a 90° bend obtained by manually grasping a coated test panel at opposing edges of shortest dimension and manually bending the panel over the edge of a flat surface, such as the edge of a table, with the panel being typically positioned at such edge to obtain a bend at approximately the mid-section of the panel. The bending is continued until the panel, by visual inspection, is viewed to have a bend of approximately 90°.

Table 2

| Pre-Paint Coating Zinc | Salt Spray % Corrosion Without Draw 305 Hours | | Double Draw: % Coating Retained |
| --- | --- | --- | --- |
| | Face | Bend | |
| Commercial | 5 | 20 | 58 |
| Classified | 4 | 15 | 100 |

It can be readily noted in Table 2 that the panels initially reported contain the commercial zinc in the pre-paint coating composition and that such panels provide a most undesirable coating adhesion in the draw test. Additionally, the panels prepared for comparative purposes do not fare as well in the salt spray corrosion resistance testing, as the panels secondly reported in Table 2 and which contain a pre-paint coating composition of the present invention. The results highlight the factor that, although the comparative pre-paint composition is made from a commercial zinc having a desirable weight percent of particles finer than 2 microns and an acceptable average size of 3.65 microns, such zinc has too many particles larger than 16 microns; and further, it has an unsatisfactory weight percent of particles greater than 10 microns. Thus, such particulate zinc forms an unacceptable pre-paint composition. On the other hand, the pre-paint composition of the present invention provides for an excellent, highly desirable adherent coating.

We claim:

1. In a pre-paint coating composition adapted for treating metal substrates and providing corrosion resistance thereto, said composition comprising liquid medium containing a hexavalent chromium-containing substance, a reducing agent and pulverulent zinc, the improvement comprising pulverulent zinc having particle size such that virtually all particles have size finer than 16 microns, with less than about 10 weight percent of said particles having size greater than 10 microns and with from about 5 to about 25 weight percent having size finer than 2 microns.

2. The coating composition of claim 1 wherein said substance is a member selected from the group consisting of chromic acid and a chromate.

3. The coating composition of claim 1 characterized by having an alkaline pH.

4. The coating composition of claim 3 further characterized by containing an alkali metal phosphate.

5. The coating composition of claim 1 wherein said reducing agent is supplied by carboxylic acid plus additional organic substance.

6. The coating composition of claim 5 wherein said acid is dicarboxylic acid and said additional organic substance is selected from the group consisting of succinimide, acrylamide and aspartic acid.

7. The coating composition of claim 5 wherein said liquid medium is supplied by substance selected from the group consisting of water, tertiary alcohols, chlorinated hydrocarbons and mixtures thereof.

8. The coating composition of claim 1 wherein said pulverulent zinc has particle size such that not more than 2 weight percent of said particles have size greater than 15 microns, with less than about 6 weight percent of said particles having size greater than 10 microns and with between about 10–20 weight percent having size finer than 2 microns, and said zinc has an average particle size of from about 3.2 to about 6 microns.

9. In the method of preparing a metal substrate to receive the deposition of paint, which method comprises establishing on said substrate a pre-paint coating composition adapted for treating metal substrates and comprising liquid medium containing a hexavalent chromium-containing substance, a reducing agent and pulverulent zinc, the improvement comprising incorporating in said composition pulverulent zinc having particle size such that virtually all particles have size finer than 16 microns, with less than about 10 weight percent of said particles having size greater than 10 microns, and with from about 5 to about 25 weight percent having size finer than 2 microns.

10. The method of claim 9 further characterized by permitting evaporation of volatile substituents from the coating composition prior to application thereto of a paint topcoating.

11. The method of claim 10 further characterized by heating said substrate at elevated temperature prior to application thereto of a paint topcoating.

12. A coated article prepared according to the method of claim 9.

13. The composition of claim 1 for preparing a pre-paint coating adapted for treating metal substrates and providing corrosion-resistance thereto, said composition further comprising a thickening agent.

14. In a method of preparing a corrosion resistant coated metal substrate having an adherent paint coating, which method comprises:
1. establishing on the surface of said substrate a pre-paint coating composition adapted for treating metal substrates and providing corrosion resistance thereto, said composition comprising liquid medium containing a hexavalent chromium-containing substance, a reducing agent and pulverulent zinc;
2. applying on the treated metal surface a paint topcoating; and
3. permitting evaporation of volatile coating substituents, thereby obtaining a dry paint film, the improvement comprising incorporating in said pre-paint coating composition pulverulent zinc having particle size such that virtually all particles have size finer than 16 microns and less than about 10 weight percent of said particles have size greater than 10 microns, and with from about 5 to about 25 weight percent having size finer than 2 microns.

15. The method of claim 14 wherein volatile coating substituents are at least in part volatilized during heating of said coating composition at elevated temperature.

16. The method of claim 14 characterized by permitting volatilization of substituents from said pre-paint coating composition prior to application of said paint topcoating.

17. The method of claim 16 wherein said substituents are volatilized by heating at elevated temperature.

18. The method of claim 14 wherein said paint topcoating contains finely divided substance, which substance retains particulate integrity in the resulting paint topcoating.

19. The method of claim 18 characterized by applying to said resulting treated metal surface a paint topcoating containing a particulate, electrically conductive pigment.

20. The method of claim 19 wherein said electrically conductive pigment is pulverulent zinc.

21. A pre-painted and painted metal substrate prepared according to the method of claim 14.

* * * * *